United States Patent
Knoop

(10) Patent No.: US 8,920,988 B2
(45) Date of Patent: Dec. 30, 2014

(54) FUEL CELL SYSTEM

(71) Applicant: Daimler AG, Stuttgart (DE)

(72) Inventor: Andreas Knoop, Esslingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/072,135

(22) Filed: Nov. 5, 2013

(65) Prior Publication Data

US 2014/0087278 A1   Mar. 27, 2014

Related U.S. Application Data

(63) Continuation of application No. 12/933,054, filed as application No. PCT/EP2009/001484 on Mar. 3, 2009.

(30) Foreign Application Priority Data

Mar. 18, 2008   (DE) .......................... 10 2008 014 783

(51) Int. Cl.
   *H01M 8/04*   (2006.01)

(52) U.S. Cl.
   CPC ...... *H01M 8/04097* (2013.01); *H01M 8/04089* (2013.01); *Y02E 60/50* (2013.01)
   USPC .......................................................... 429/415

(58) Field of Classification Search
   USPC ................................................. 429/400–535
   See application file for complete search history.

(56) References Cited

U.S. PATENT DOCUMENTS

| | | | |
|---|---|---|---|
| 6,902,840 B2 | 6/2005 | Blanchet et al. | |
| 7,037,609 B2 | 5/2006 | Sugawara et al. | |
| 8,029,939 B2 * | 10/2011 | Andreas-Schott et al. | ... 429/454 |
| 2003/0148167 A1 | 8/2003 | Sugawara et al. | |
| 2005/0100777 A1 | 5/2005 | Gurin et al. | |
| 2005/0130008 A1 * | 6/2005 | Uozumi | .......................... 429/34 |
| 2006/0251935 A1 | 11/2006 | Barrett et al. | |
| 2007/0190389 A1 | 8/2007 | Hinsenkamp et al. | |

FOREIGN PATENT DOCUMENTS

| | | |
|---|---|---|
| CN | 1561556 A | 1/2005 |
| CN | 1666358 A | 9/2005 |
| JP | 2003-151588 A | 5/2003 |
| JP | 2003-311187 A | 11/2003 |
| JP | 2004-206948 A | 7/2004 |
| JP | 2005-108698 A | 4/2005 |
| WO | WO 2007/078292 A2 | 7/2007 |

OTHER PUBLICATIONS

Ushio et al. JP 2004/206948. Jul. 22, 2004. English machine translation by JPO.*

(Continued)

*Primary Examiner* — Kenneth Douyette
*Assistant Examiner* — James Lee
(74) *Attorney, Agent, or Firm* — Crowell & Moring LLP

(57) ABSTRACT

The potential energy from a hydrogen tank is used in a gas jet pump, which draws in anode waste gas via an inlet and recirculates it to an anode inlet. To ensure that this system operates effectively even under low loads, a part of the waste gas is supplied to a compressor, and the compressed waste gas is supplied to the motive jet inlet of a gas jet pump, which may be the same one to which the hydrogen from the tank is also supplied. Different gas jet pumps may also be used, for the hydrogen from the tank on the one hand, and the compressed waste gas on the other hand.

6 Claims, 1 Drawing Sheet

(56) References Cited

OTHER PUBLICATIONS

International Search Report (PCT/ISA/210) including Forms PCT/ISA/237 dated Jun. 25, 2009 {Eleven (11) pages}.

Chinese Office Action dated Sep. 13, 2012 (Five (5) pages}.
Japanese Office Action dated Mar. 21, 2013 {Three (3) pages}.
Japanese Decision to Grant a Patent with partial English translation thereof dated Sep. 3, 2013 {Four (4) pages}.

* cited by examiner

FUEL CELL SYSTEM

This application is a divisional of U.S. Ser. No. 12/933,054, filed Sep. 16, 2010, which is a National Stage of PCT International Application No, PCT/EP2009/001494, filed Mar. 3, 2009, which claims priority under 35 U.S.C. §119 to German Patent Application No. 10 2008 014 783.4, filed Mar. 18, 2008, the entire disclosure of which is herein expressly incorporated by reference.

BACKGROUND AND SUMMARY OF THE INVENTION

The invention relates to a fuel cell system in which anode exhaust gas is recirculated to the anode inlet.

This fuel cell system comprises an anode circuit having a gas jet pump with two inlets and one outlet, for conveying surplus hydrogen from the anode outlet to the anode inlet. A "motive jet" under elevated pressure is introduced at one inlet, and passes through the gas jet pump to its outlet. A further inlet of the gas jet pump is arranged such that the motive jet flowing through the gas jet pump produces a low pressure at the further inlet, and is thereby able to draw in gas via the further inlet and entrain it as far as the outlet.

It is known in particular from fuel cell systems to utilize the high pressure which hydrogen is conventionally under in a hydrogen tank to form a motive jet for a gas jet pump. The gas jet pump is thus arranged between the hydrogen tank and the anode inlet. As a result, the quantity of anode waste gas that is drawn in via the further inlet of the gas jet pump is directly dependent on the quantity of hydrogen gas supplied from the tank and forming the motive jet, which in turn depends on the fuel cell system load.

This known arrangement is problematic under low load. In particular, it would then be desirable for somewhat more anode waste gas to be recirculated than is possible with the gas jet pump. Satisfactory recirculation under low loads has heretofore been made possible, if need be, by using a blower. However, a blower is a complex and expensive component, which is susceptible to failure in particular at cold temperatures due to icing.

It is therefore an object of the present invention to provide a fuel cell system which operates reliably, even under low loads, and is nonetheless inexpensive.

This and other objects and advantages are achieved by the fuel cell system according to the invention, in which a part of the anode waste gas is supplied to a compressor, which comprises it and supplies it to the motive jet side of a gas jet pump. In this way it is ensured that a sufficient quantity of gas in particular a quantity sufficient for low loads, is always available on the motive jet side. In practice only very small quantities of anode waste gas need to be compressed, such that the power of the compressor may be so low that it can be operated with a 12 volt power supply. Expenditure is therefore low, while the solution is nevertheless effective.

It is advantageous, first of all, for hydrogen from a tank also to be supplied to the same gas jet pump to which the compressed waste gas is supplied, as in the prior art. This may be achieved by bringing the compressed waste gas and the hydrogen from the tank together upstream of the gas jet pump. It needs to be ensured that the compressed waste gas and the hydrogen are at roughly the same pressure. The compressed waste gas and the hydrogen may however also be supplied directly to the gas jet pump independently of one another, using different inlet nozzles.

Another embodiment of the invention has two gas jet pumps, to one of which the compressed waste is supplied, with hydrogen from the tank being supplied to the other. Each gas jet pump then has a part of the uncompressed waste gas supplied to it as gas to be drawn in. With this embodiment too it is ensured that the fuel cell system functions under low loads.

To prevent flow in undesired directions, all the gas jet pumps in this embodiment need to have a nonreturn valve on the anode inlet side.

Other objects, advantages and novel features of the present invention will become apparent from the following detailed description of the invention when considered in conjunction with the accompanying drawings.

DETAILED DESCRIPTION OF THE DRAWINGS

Figure 1:
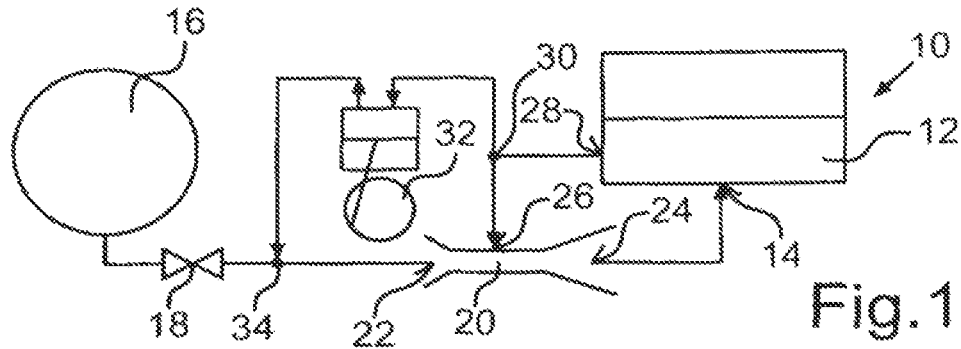
FIG. 1 is a schematic representation of a first embodiment of the invention.

As shown in the Figures, a fuel cell 10 comprises an anode 12, which has an anode inlet 14, via which hydrogen is supplied. The majority of the hydrogen comes from a tank 16. Arranged downstream of the tank 16 are a valve 18 and a gas jet pump 20. The hydrogen jet coming from the tank 16 functions as the motive jet for the gas jet pump 20, this being supplied to a motive jet inlet (normally a nozzle) 22 of the gas jet pump 20, and exiting at an outlet 24. As a result of the low pressure generated by the motive jet, further gas may be drawn in via a further inlet 26 of the gas jet pump 20. In the present case, the waste gas emerging from the anode 12 via an anode outlet 28 is supplied in part to the further inlet 26. According to the invention, provision is then made for a further part of the waste gas to be supplied from a branch point 30, which also leads to the further inlet 26, to a compressor 32, there to be compressed to the pressure of the hydrogen coming from the tank 16 downstream of the valve 18 and also to be introduced into the hydrogen stream downstream of the valve 18 at a point 34 which lies upstream of the inlet nozzle 22 in the first embodiment according to FIG. 1. Because a proportion of the waste gas emerging from the anode outlet 28 is always used in any case to form the motive jet, the system is less dependent on the quantity of hydrogen supplied via the valve 18 and consequently operates better in particular under low fuel cell loads than if the branch with the compressor 32 is omitted.

Figure 2:
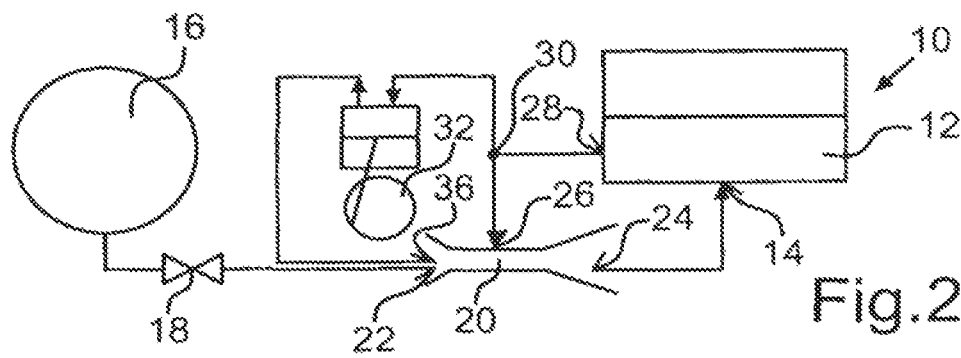
FIG. 2 is a schematic representation of a second embodiment of the invention.

In a modification of the embodiment of FIG. 1, the precompressed waste gas is supplied directly from the compressor to the gas jet pump 20, the latter then having two inlet nozzles, namely a first inlet nozzle 22, via which the hydrogen is supplied from the valve 18, and a second inlet nozzle 36, via which precisely the compressed waste gas is supplied. (See FIG. 2.)

Figure 3:
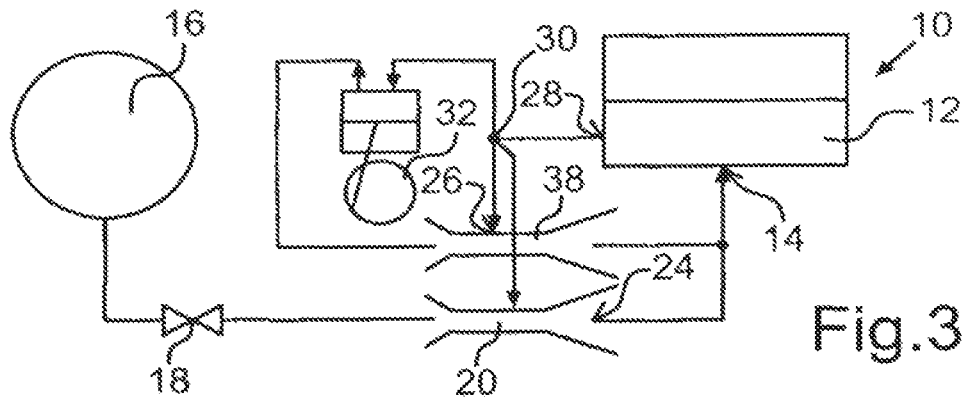
FIG. 3 is a schematic representation of a third embodiment of the invention.
Figure 4:
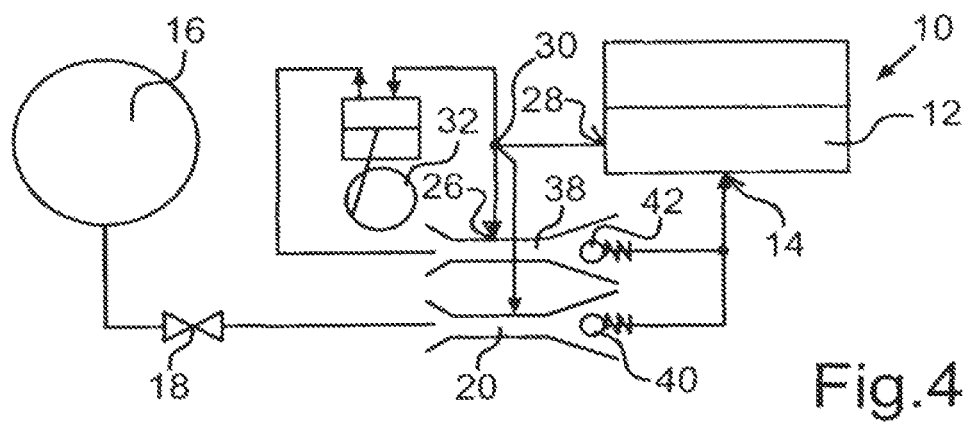
FIG. 4 is a schematic representation of a modification of the third embodiment of invention.

The invention also works if the hydrogen from the tank 16 and the compressed waste gas are supplied to different gas jet pumps 20 and 38 respectively. Different parts of the waste gas from the anode 12 are supplied to each gas jet pump 20 and 38, the two gas jet pumps 20 and 38 operating mutually independently (See FIG. 3.) In the latter embodiment, the compressor 32 must in any case always be running, so that gas does not pass through the gas jet pump 38 in the opposite direction from normal, due to certain pressure differences. This may be prevented if, as shown in FIG. 4, the two gas jet pumps 20 and 38 each comprise a nonreturn valve 40 and 42 respectively.

In accordance with the stated object, the compressor 32 serves in particular to recirculate a sufficient stream of waste gas when the fuel cell 10 is under low loads. The quantity of waste gas compressed by the compressor 32 may here be relatively small. The compressor 32 does not therefore need to be of a high power and may for example be operated with a 12 V voltage. It is significantly less expensive to provide the compressor 32 than a blower, as is occasionally used in the anode circuit in the prior art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

10 Fuel cell
12 Anode
14 Anode inlet
16 Tank
18 Valve
20 Gas jet pump
22 Inlet nozzle
24 Outlet of the gas jet pump 20
26 Inlet of the gas jet pump 20
28 Anode outlet
30 Branch point
32 Compressor
38 Gas jet pump
40 Nonreturn valve
42 Nonreturn valve

What is claimed is:

1. A fuel cell system, comprising:
a hydrogen tank containing hydrogen;
a fuel cell with an anode, the anode having an anode inlet and an anode outlet;
a gas jet pump having an outlet, a motive jet inlet and a second inlet, wherein the second inlet is separate from the motive jet inlet, the motive jet inlet includes a first motive jet inlet and a second motive jet inlet, and the outlet is coupled to the anode inlet;
a compressor; and
an anode recirculation line arranged to provide waste gas from the anode outlet to the anode inlet,
wherein the anode recirculation line includes a branch point to provide a first waste gas stream to the second inlet of the gas jet pump and a second, separate waste gas stream to the compressor,
wherein the compressor is coupled to the gas jet pump so that the second waste gas stream that is compressed by the compressor is provided to the motive jet inlet of the gas jet pump, and
wherein the second stream of compressed waste gas is supplied to the first motive jet inlet of the gas jet pump and hydrogen from the hydrogen tank is supplied to the second motive jet inlet of the gas jet pump.

2. The fuel cell system as claimed in claim 1, wherein the compressor is structurally configured to operate using a 12 V voltage.

3. A fuel cell system, comprising:
a hydrogen tank containing hydrogen;
a fuel cell with an anode, the anode having an anode inlet and an anode outlet;
first and second gas jet pumps each having an outlet, a motive jet inlet and a second inlet, wherein each second inlet is separate from their respective motive jet inlets and each outlet is coupled to the anode inlet;
a compressor; and
an anode recirculation line arranged to provide waste gas from the anode outlet to the anode inlet,
wherein the anode recirculation line includes a branch point to provide a first waste gas stream to the second inlet of each of the gas jet pumps and a second, separate waste gas stream to the compressor,
wherein the compressor is coupled to the first gas jet pump so that the second waste gas stream that is compressed by the compressor is provided to the motive jet inlet of the first gas jet pump, and
wherein the hydrogen tank is coupled to the second gas jet pump so that the hydrogen from the hydrogen tank is supplied to the motive jet inlet of the second gas jet pump.

4. The fuel cell system as claimed in claim 3, wherein both the first and second gas jet pumps have a nonreturn valve arranged between the outlet and the anode inlet.

5. The fuel cell system as claimed in claim 3, wherein the first and second gas jet pumps are configured to operate mutually independently.

6. The fuel cell system as claimed in claim 5, wherein the compressor is structurally configured to operate using a 12 V voltage.

* * * * *